3,338,744

PROCESS FOR VACUUM DEPOSITING HIGH PURITY SUPERCONDUCTIVE NIOBIUM FILMS WITHOUT THE USE OF HIGH VACUUM

Philip J. Clough, Reading, and Peter Fowler, Ipswich, Mass., assignors to National Research Corporation, Cambridge, Mass., a corporation of Massachusetts Filed May 23, 1963, Ser. No. 282,635
1 Claim. (Cl. 117—227)

The invention described herein was made in the performance of work under an NASA contract and is subject to the provisions of the National Aeronautics and Space Act of 1958, Public Law 85–568, as amended.

The present invention relates to the production of thin superconducting films of niobium, particularly films having superior field tolerance compared to bulk niobium. Such films are useful in superconductive bistable devices for computer circuitry and for magnet components such as magnetic field shielding means.

It is an object of the invention to provide a thin film of niobium which can carry current at liquid helium temperatures, while under a transverse, perpendicular field in excess of 10 kilo-oersteds.

It is a further object of the invention to provide a method of making such a film.

It is a further object to simplify the method so that it will be feasible on a commercial scale.

These and other objects of the invention will in part be obvious and will in part appear hereinafter.

The invention accordingly comprises the product and process involving the several steps and the relation and the order of one or more of such steps with respect to each of the others which are exemplified in the following detailed disclosure and the scope of the application which will be defined in the claim.

For a further understanding of the nature and objects of the invention, reference should be had to the following detailed description taken in connection with the accompanying drawing which is a diagrammatic, fractional, sectional view of one preferred form of the invention.

Figure 1:
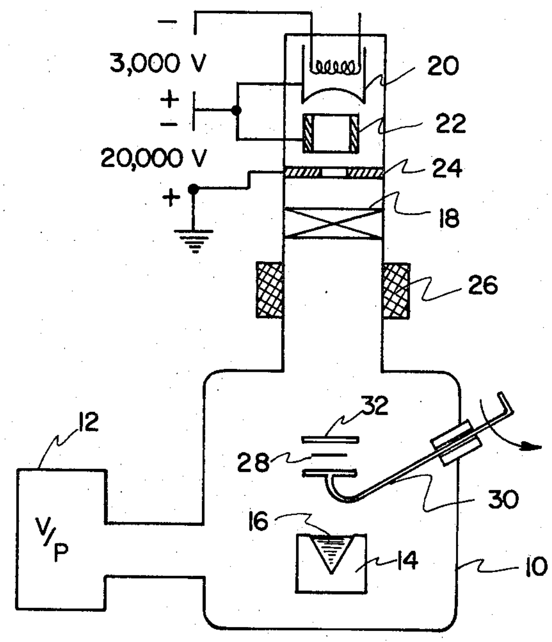
Figure 2:
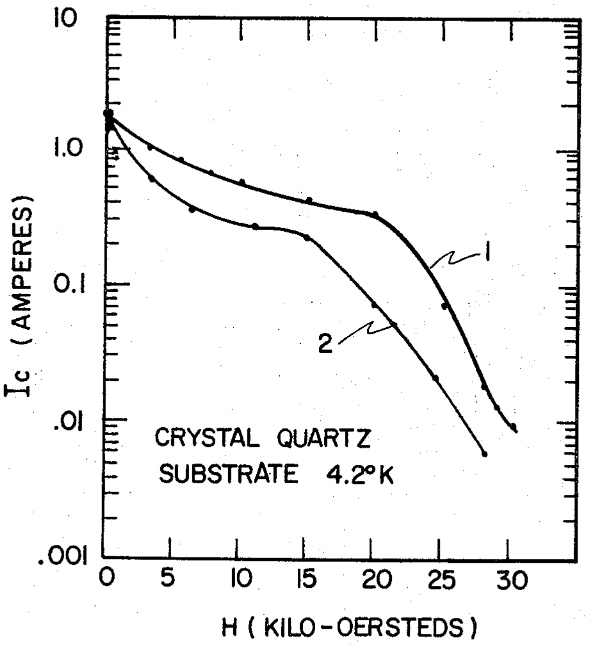

FIG. 1 comprises a diagram of the apparatus used in producing thin films of niobium, and FIG. 2 is a critical current-field tolerance curve showing the high performance of the product of the invention and demonstrating an aging effect.

In accordance with the invention, high purity films are deposited on an inert substrate by vacuum deposition. The invention is characterized by a high power input to the niobium source for a short period. This permits the use of a low vacuum in the chamber while attaining a purity heretofore obtainable only under vacuum conditions on the order of $10^{-10}$ mm. Hg abs.

The high power input produces an upwardly flowing stream of vapors. The power input is preferably provided by a circular electron beam which produces a stream of conical form. However, the invention is also applicable to variations such as a focused-sheet-electron-beam impinging on a long trough of niobium to produce a wedge shaped beam. The effect of this power input is that the stream is at an elevated temperature which corresponds to a high vapor pressure of niobium and that the stream is of high density. For instance, at 2900° C. the partial pressure of niobium is 0.1 mm. Hg. The ability of a contaminant to penetrate the cone is limited by this vapor pressure so long as it is greater than the chamber pressure. The mean free path of oxygen entering the niobium stream at 0.1 mm. Hg is $5.4 \times 10^{-3}$ cm. Beyond this depth diffusion of oxygen drops off drastically. The central portion of the niobium cone which impinges on the substrate will be free of contamination from gaseous impurities.

These beneficial effects of the dense niobium cone are achieved by evaporating niobium at a rate in excess of $3 \times 10^{-3}$ grams per square centimeter of surface of the molten niobium pool formed by the impinging electron beam. Evaporation rate is determined by temperature and molecular weight using the data given in the article "Vapor Pressure and Rate of Evaporation" by Koller, pp. 671–698, of Scientific Foundations of Vacuum Technique (Dushman, ed.—2d Edition) and Honig, pp. 567–575, RCA Review (December 1962).

It is preferred to mask the outer portion of the cone so that only the relatively pure central portion of the cone can strike the substrate.

The apparatus comprises a vacuum chamber 10 with a vacuum pumping system 12. The system comprises a nitrogen trap to eliminate backstreaming oil vapors from the pump and condensible vapors from the chamber. The niobium is contained in a water cooled copper crucible 14 having a wide opening. The niobium is supplied in the form of gravel having the following impurities:

| | Percent |
|---|---|
| N | .047 |
| O | .15 |
| C | .02 |
| Ta | .12 |
| Ni | .007 |
| Ti | .005 |

Other impurities being below .005% each.

The gravel is melted by a self-accelerated-electron-beam gun 18 comprising an indirectly heated cathode 20, a grid electrode 22, anode 24 and focus coil 26. The niobium is aligned with the electron beam axis. A quartz substrate 28 is placed about 15 cm. from the niobium on a line 24° off the electron beam axis. A shutter 30 is provided to shield the substrate from vapors streaming from the niobium pool 16. A heater 32 is provided for heating the substrate.

*Example*

The chamber 10 was evacuated by pump system 12 to a pressure of $10^{-7}$ mm. Hg. Then the niobium was heated by the electron gun 18 to form pool 16 of molten niobium. The power input to the niobium was 11 to 13 kilowatts and the niobium temperature was about 3100–3250° C., corresponding to niobium vapor pressures of about 0.5 to 2 mm. Hg.

The chamber pressure rose above $10^{-4}$ mm. Hg as heat radiated to the chamber walls caused outgassing. But as the vapors streamed from the niobium pool and condensed on the chamber walls, the chamber pressure went down to an equilibrium below $10^{-5}$ mm. Hg.

The substrate heater was operated to preheat the substrate 28 at 400° C. Then the substrate was cooled to 200° C. before evaporating the niobium.

The shutter 30 was moved aside, exposing the substrate to the stream of niobium vapors briefly.

Such runs were repeated several times and the resulting coated substrates were tested for critical current at liquid helium temperature and under transverse perpendicular magnetic fields. They showed superconducting properties in fields much greater than reported in the literature for pure annealed niobium wire (2.9 koe.) or cold worked niobium wire (about 8 koe.). At about 12 koe. the present films carried:

| | Amperes |
|---|---|
| A | About .004 |
| B | About .05 |
| C | About .3 |

Film A was about 300 A., film B about 1000 A., and film C about 5000 A. thick. Measurements were also made in the longitudinal field of a 30 kilo-oersted magnet. The curves of FIG. 2 show the results of these measurements. Curve 1 was made first and curve 2 was made from the same sample three months later. The aging effect shown by the curves has been confirmed in other experiments.

Since certain changes may be made in the above product and process without departing from the scope of the invention herein involved, it is intended that all matter contained in the above description or shown in the accompanying drawing be interpreted as illustrative and not in a limiting sense.

What is claimed is:

A method of preparing high purity, superconductive thin film coatings of niobium comprising the steps of forming and maintaining a pool of molten niobium at a temperature in excess of 3000° C. by electron bombardment to form a dense stream of niobium vapors, maintaining the residual pressure in the region outside the stream below 0.1 mm. Hg and above $10^{-7}$ mm. Hg, supplying a sufficient power density to the said molten pool via the electron bombardment so that the rate of evaporation is in excess of $3\times10^{-3}$ grams evaporated per square cm. of pool surface per second, exposing a substrate to a central portion of the stream after an initial period during which the gettering action of niobium reduces the pressure in the coating region, maintaining said power density and evaporation rate during the period of exposure, said period of exposure being less than about 200 seconds so that a coating of niobium less than 10 microns thick is formed.

References Cited

UNITED STATES PATENTS

| | | | |
|---|---|---|---|
| 2,665,223 | 1/1954 | Clough et al. | 117—107 |
| 3,024,965 | 3/1962 | Milleron | 230—69 |
| 3,046,936 | 7/1962 | Simons | 118—49.1 |
| 3,091,556 | 5/1963 | Behrndt et al. | 117—227 |

ALFRED L. LEAVITT, *Primary Examiner.*

A. GOLLIAN, *Assistant Examiner.*